(12) United States Patent
Lo (10) Patent No.: US 9,364,706 B2
(45) Date of Patent: Jun. 14, 2016

(54) TREADMILL

(71) Applicant: DK City Corporation, Taichung (TW)

(72) Inventor: Chiu Hsiang Lo, Taichung (TW)

(73) Assignee: DK CITY CORPORATION, Taichung (TW)

(*) Notice: Subject to any disclaimer, the term of this patent is extended or adjusted under 35 U.S.C. 154(b) by 25 days.

(21) Appl. No.: 14/283,175

(22) Filed: May 20, 2014

(65) Prior Publication Data

US 2015/0335941 A1    Nov. 26, 2015

(51) Int. Cl.
*A63B 22/00* (2006.01)
*A63B 71/00* (2006.01)
*A63B 22/02* (2006.01)

(52) U.S. Cl.
CPC .............. *A63B 22/0015* (2013.01); *A63B 22/00* (2013.01); *A63B 22/02* (2013.01); *A63B 22/0235* (2013.01)

(58) Field of Classification Search
CPC .............. A63B 22/00; A63B 22/0015; A63B 22/0017; A63B 22/0207; A63B 22/0214; A63B 22/0221; A63B 22/0228; A63B 22/0235; A63B 22/0242; A63B 22/0257; A63B 22/0285; A63B 2022/025; A63B 2022/0264; A63B 2022/0271; A63B 2022/0278; A63B 2022/0292
USPC ...................................................... 482/51, 54
See application file for complete search history.

(56) References Cited

U.S. PATENT DOCUMENTS

| 3,637,206 | A | * | 1/1972 | Chickering, III | A63B 22/02 482/54 |
| 4,374,587 | A | * | 2/1983 | Ogden | A63B 22/0023 482/54 |
| 4,423,864 | A | * | 1/1984 | Wiik | A63B 22/0012 434/253 |
| 4,576,352 | A | * | 3/1986 | Ogden | A63B 22/0023 248/188.4 |
| 4,602,779 | A | * | 7/1986 | Ogden | A63B 22/0023 198/846 |
| 4,759,540 | A | * | 7/1988 | Yu | A63B 22/0023 482/54 |
| 5,085,426 | A | * | 2/1992 | Wanzer | A63B 22/02 482/54 |
| 5,462,504 | A | * | 10/1995 | Trulaske | A61B 5/0002 482/54 |
| 5,527,245 | A | * | 6/1996 | Dalebout | A63B 21/00072 482/103 |
| 5,733,228 | A | * | 3/1998 | Stevens | A63B 22/0023 482/51 |
| 5,855,537 | A | * | 1/1999 | Coody | A63B 22/0023 482/51 |
| 6,179,753 | B1 | * | 1/2001 | Barker | A63B 22/0214 482/51 |
| 7,621,850 | B2 | * | 11/2009 | Piaget | A63B 22/025 482/54 |
| 7,704,191 | B2 | * | 4/2010 | Smith | A63B 22/0056 482/51 |
| 2002/0147078 | A1 | * | 10/2002 | Wu | A63B 22/0023 482/54 |
| 2003/0125165 | A1 | * | 7/2003 | Trevino | A63B 22/0023 482/54 |
| 2004/0132584 | A1 | * | 7/2004 | Chen | A63B 22/0023 482/54 |
| 2004/0214693 | A1 | * | 10/2004 | Piaget | A63B 22/025 482/52 |
| 2005/0239607 | A1 | * | 10/2005 | Chang | A63B 22/0023 482/54 |
| 2011/0082011 | A1 | * | 4/2011 | Ellis | A63B 21/0615 482/54 |
| 2013/0190136 | A1 | * | 7/2013 | Watterson | A63B 71/0622 482/8 |

* cited by examiner

*Primary Examiner* — Stephen Crow
*Assistant Examiner* — Garrett Atkinson (57) ABSTRACT

A treadmill includes a base, a platform, a universal joint, two elevators and two telescopic elements. The universal joint is used to connect a rear portion of the base to a rear portion of the platform. Each of the elevators includes a post supported on a front portion of the base and a carriage movably supported on the post. Each of the telescopic elements includes an end connected to a front portion of the platform and another end connected to the carriage of a corresponding one of the elevators.

10 Claims, 11 Drawing Sheets

TREADMILL

BACKGROUND OF INVENTION

1. Field of Invention

The present invention relates to a treadmill and, more particularly, to a treadmill that can be tiled about two axes.

2. Related Prior Art

Figure 1:
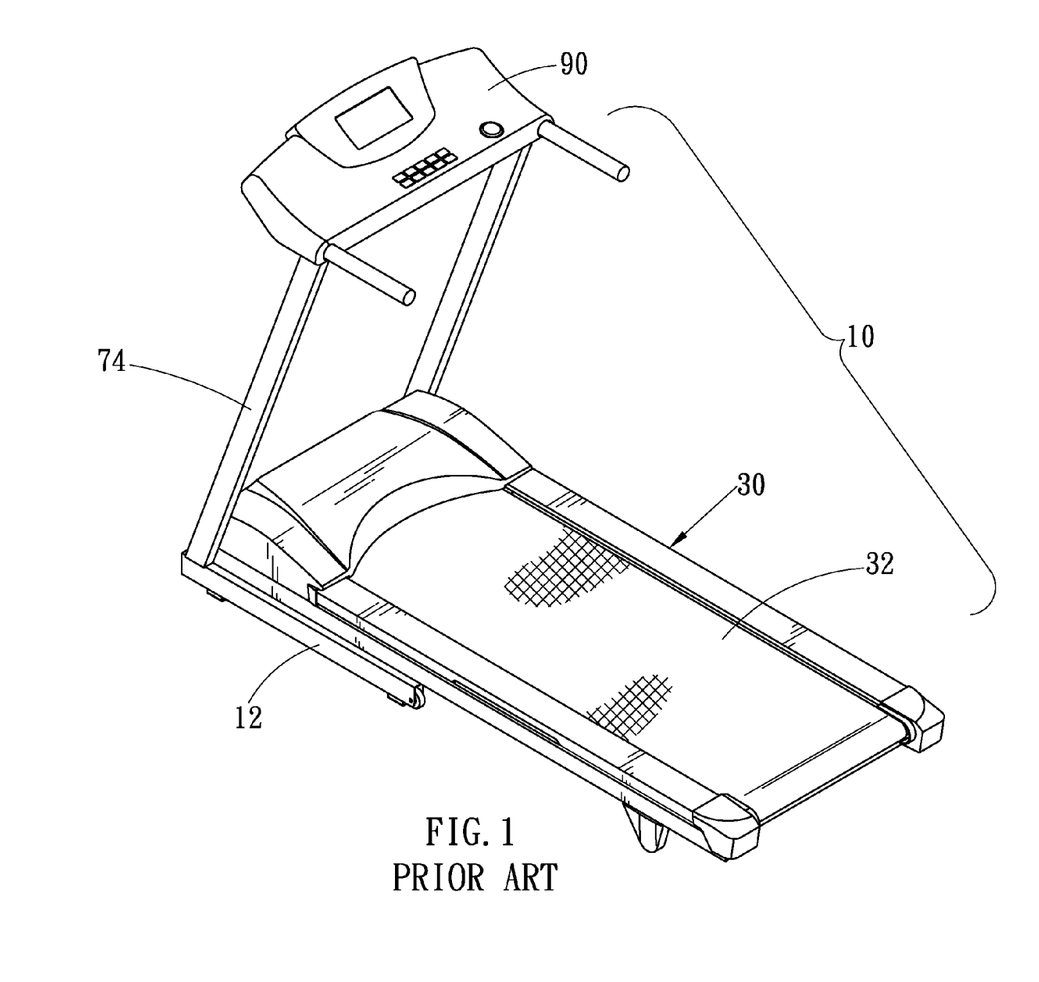
FIG. 1 is a perspective view of a conventional treadmill.

Referring to FIG. 1, a conventional treadmill 10 includes a base 12, a platform 30, a belt 32, two posts 74 and a control panel 90. The platform 30 is supported on the base 12. A front portion of the platform 30 can be lifted from a front portion of the base 12 by an elevator mechanism (not shown). The belt 32 is in the form of a loop wound on the platform 30. The posts 74 are supported on the base 12. The control panel 90 is supported on the posts 74. The control panel 90 is operable to adjust the speed of the belt 32 to hence adjust the speed of a runner. The control panel 90 is operable to adjust the angle of the platform 30 relative to the base 12 to simulate the angle of a slope. The simulation is however insufficient since the platform 30 cannot be tilted to the right or left.

Therefore, the present invention is intended to obviate or at least alleviate the problems encountered in prior art.

SUMMARY OF INVENTION

It is the primary objective of the present invention to provide a treadmill that can be tilted about two axes.

To achieve the foregoing objective, the treadmill includes a base, a platform, a universal joint, two elevators and two telescopic elements. The universal joint is used to connect a rear portion of the base to a rear portion of the platform. Each of the elevators includes a post supported on a front portion of the base and a carriage movably supported on the post. Each of the telescopic elements includes an end connected to a front portion of the platform and another end connected to the carriage of a corresponding one of the elevators.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 2:
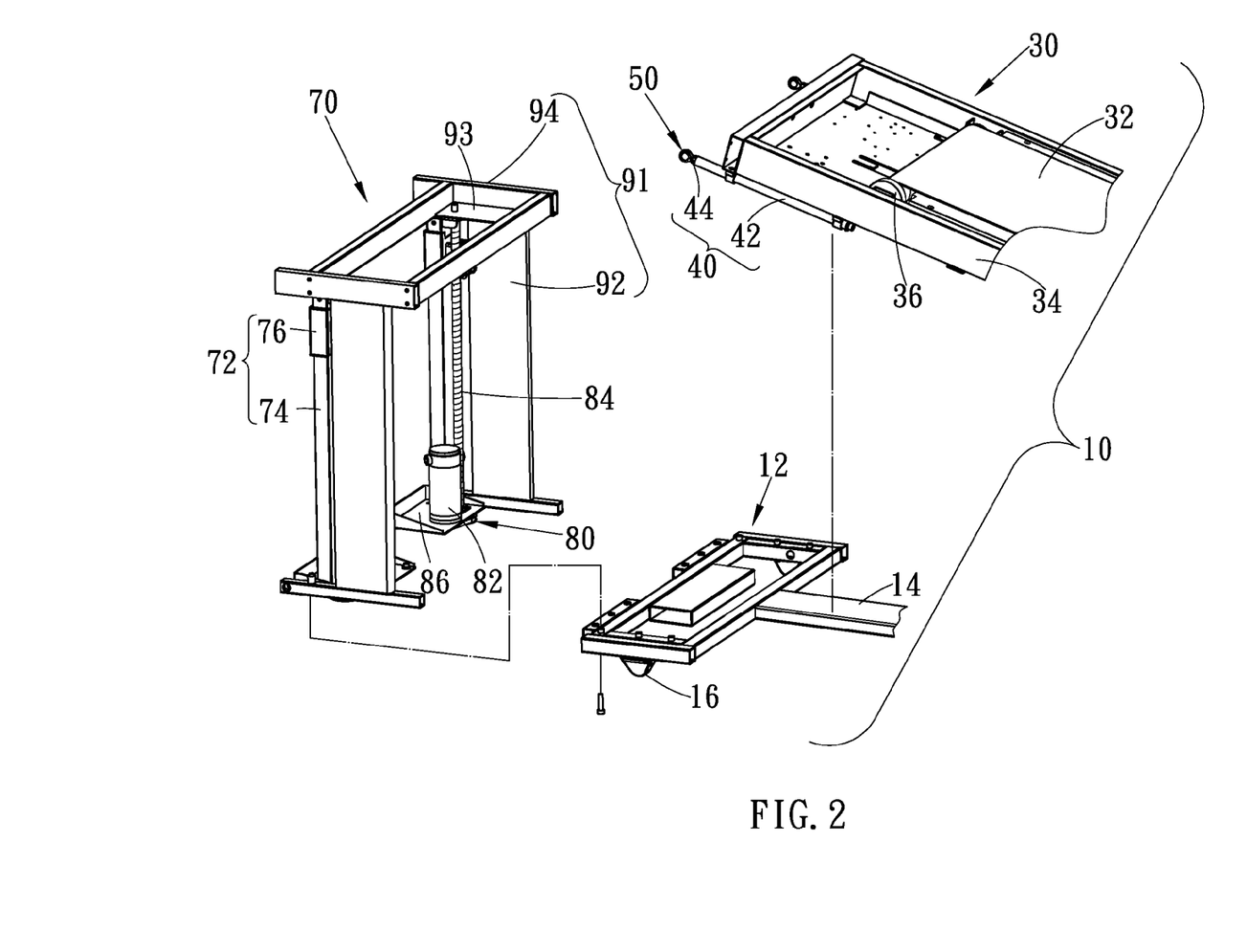
FIG. 2 is an exploded view of a front portion of a treadmill according to the preferred embodiment of the present invention.
Figure 11:
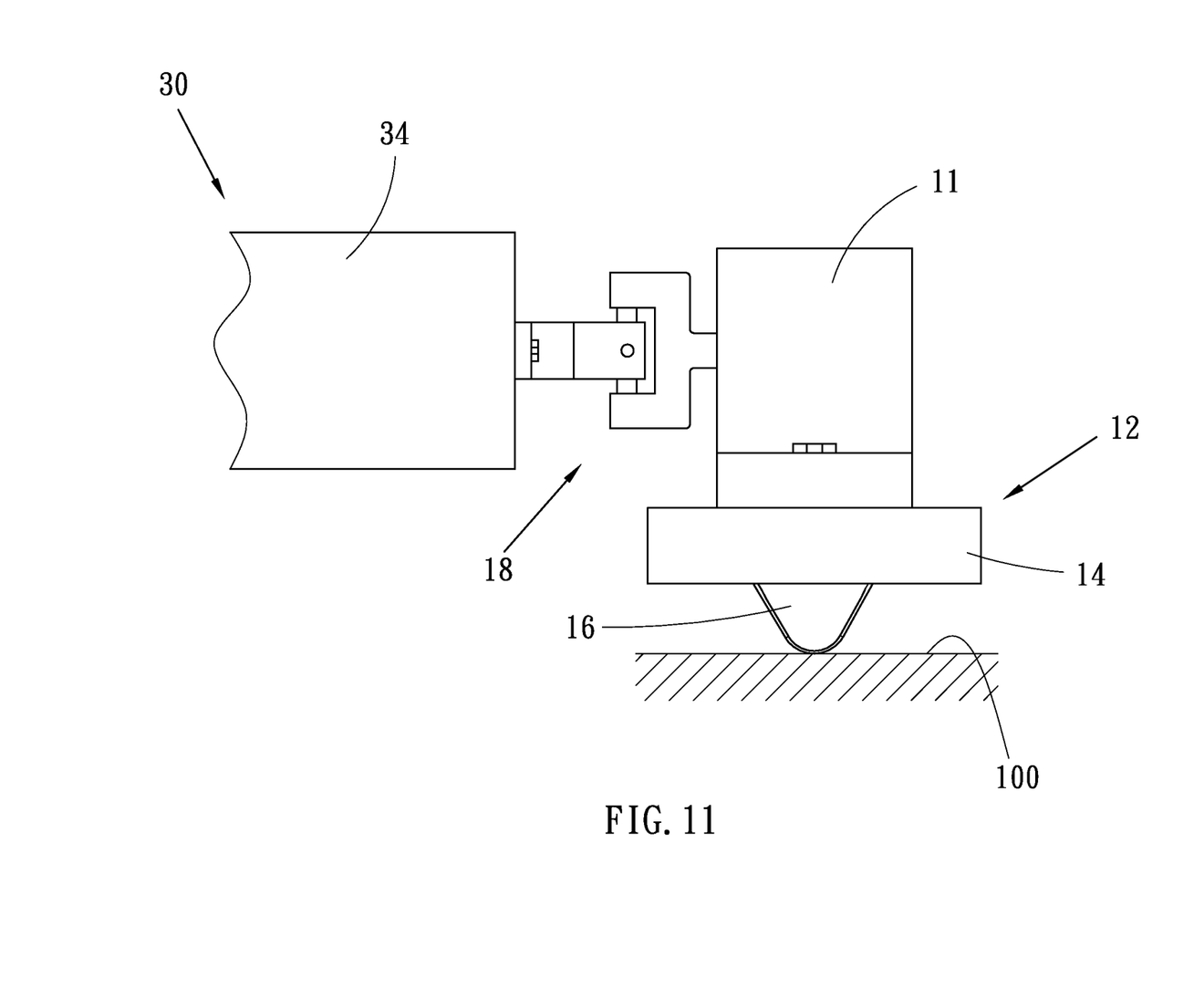
FIG. 11 is a side view of a rear portion of the treadmill illustrated in FIG. 2.

Referring to FIGS. 2 and 11, a treadmill 10 includes a base 12, a platform 30 and two elevators 70 according to the preferred embodiment of the present invention. The elevators 70 are supported on a front portion of the base 12. The platform 30 includes a front portion connected to the elevators 70 and a rear portion connected to a rear portion of the base 12.

The base 12 includes a chassis 14 and four pads 16. Two of the pads 16 are attached to the bottom of a front portion of the chassis 14. The other pads 16 are attached to the bottom of a rear portion of the chassis 14. The pads 16 can however be replaced with casters in another embodiment.

The platform 30 includes a frame 34, rollers 36 and a belt 32. The rollers 36 are supported on the frame 34. The belt 32 is in the form of a loop wound on the rollers 36. The rollers 36 can be connected to another motor (not shown) that is connected to a control panel like the control panel 90 discussed in the RELATED PRIOR ART referring to FIG. 1. The control panel is operable to change the speed of the belt 32.

A universal joint 18 is used to connect a rear portion of the frame 34 to a bearing 11 supported on the rear portion of the base 12. Thus, the frame 34 can thus be tilted relative to the base 12 about two axes. The first axis extends transversely relative to the base 12. The second axis extends longitudinally relative to the base 12.

Figure 5:
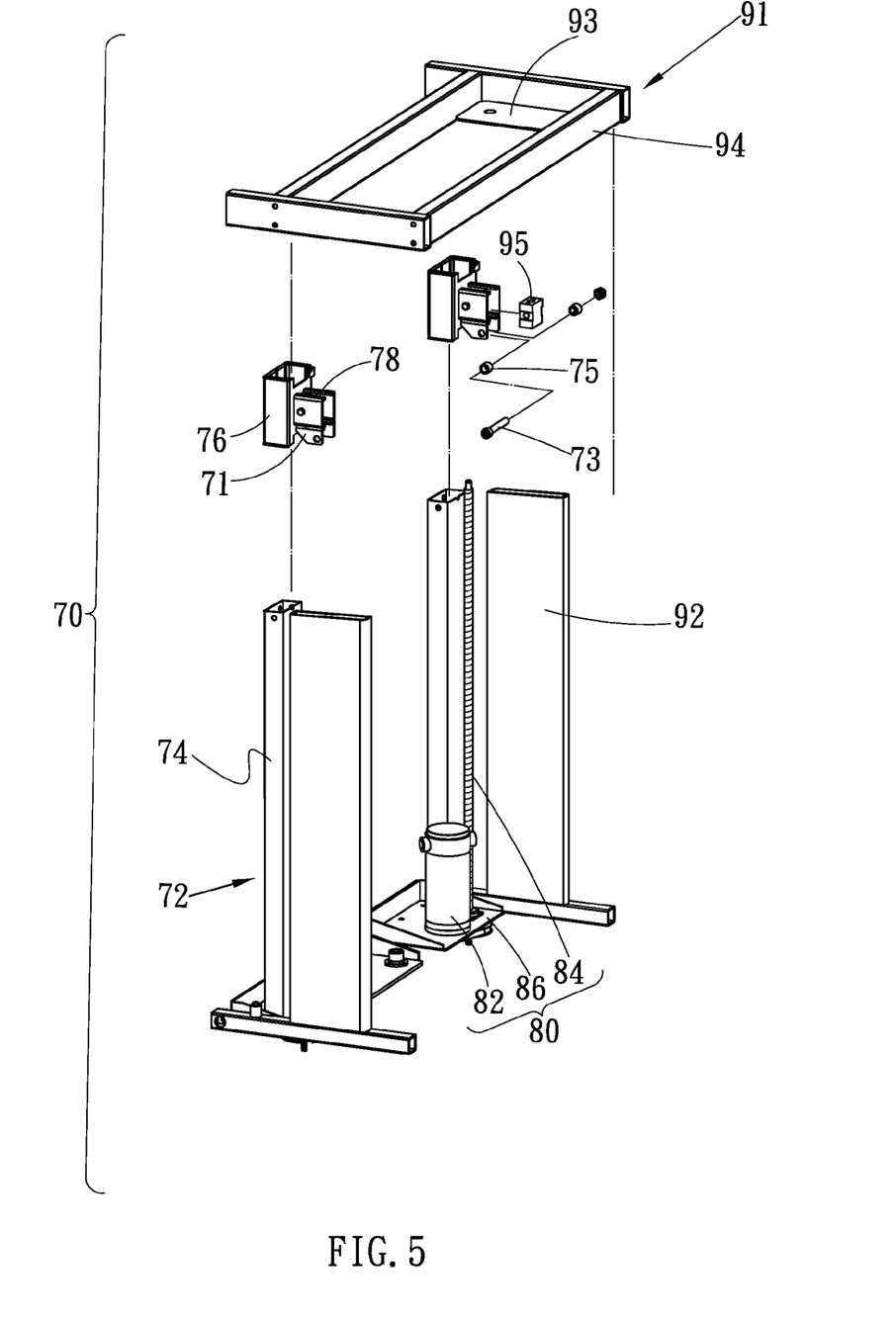
FIG. 5 is another partial and exploded view of the treadmill shown in FIG. 2.

Referring to FIGS. 2 and 5, each of the elevators 70 includes a driver unit 80 connected to a carriage unit 72. The carriage unit 72 includes a post 74, a carriage 76, a receptacle 78 and two lugs 71. The post 74 is supported on the chassis 14. The carriage 76 is a hollow element movably supported on the post 74. The receptacle 78 is connected to the carriage 76. The lugs 71 are connected to the receptacle 78.

The driver unit 80 includes a nut 95, a threaded rod 84, a motor 82 and a board 86. The nut 95 is inserted in the receptacle 78. The threaded rod 84 is engaged with the nut 95. The motor 82 is operatively connected to the threaded rod 84. The motor 82 is supported on the board 86, which is supported on the chassis 14. Thus, the motor 82 can be actuated to rotate the threaded rod 84, which can move up and down the nut 95 and the carriage 76 along the post 74.

A deck 91 is supported on the posts 74 and two lateral plates 92 that are supported on the chassis 14. The deck 91 includes a board 94 supported on a substantially rectangular frame 93. The deck 91 is used to support the control panel. The control panel is electrically connected to the motor 82 of each driver unit 80. Thus, the control panel is operable to actuate the motors 82 of the driving units 80 individually.

Figure 3:
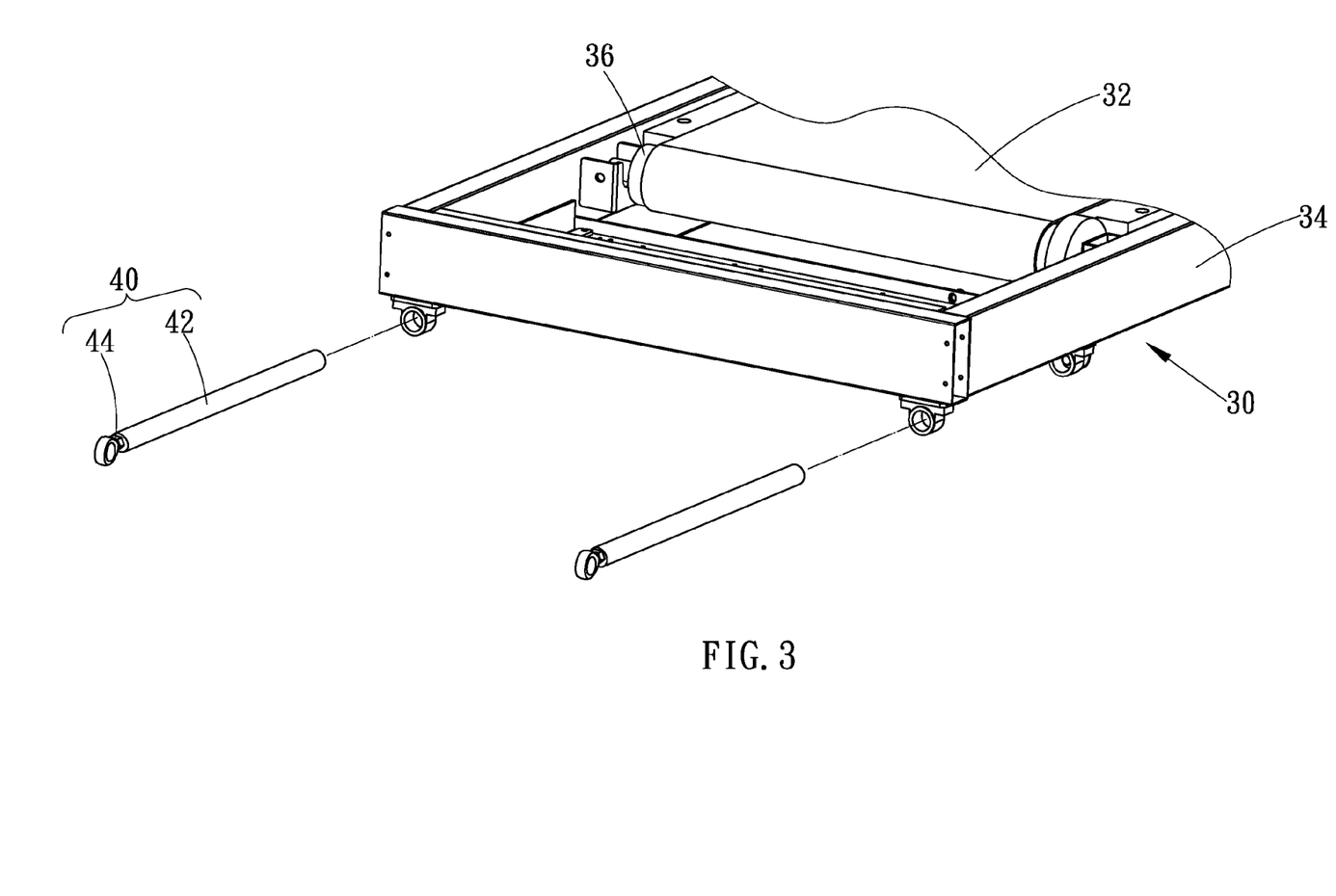
FIG. 3 is a perspective view of a front portion of a platform of the treadmill shown in FIG. 2.

Referring to FIG. 3, a front portion of the frame 34 is connected to each of the carriages 76 by a corresponding telescopic element 40 and a corresponding joint 50. Each of the telescopic elements 40 includes a tube 42 and a rod 44 movably inserted in the tube 42.

Figure 6:
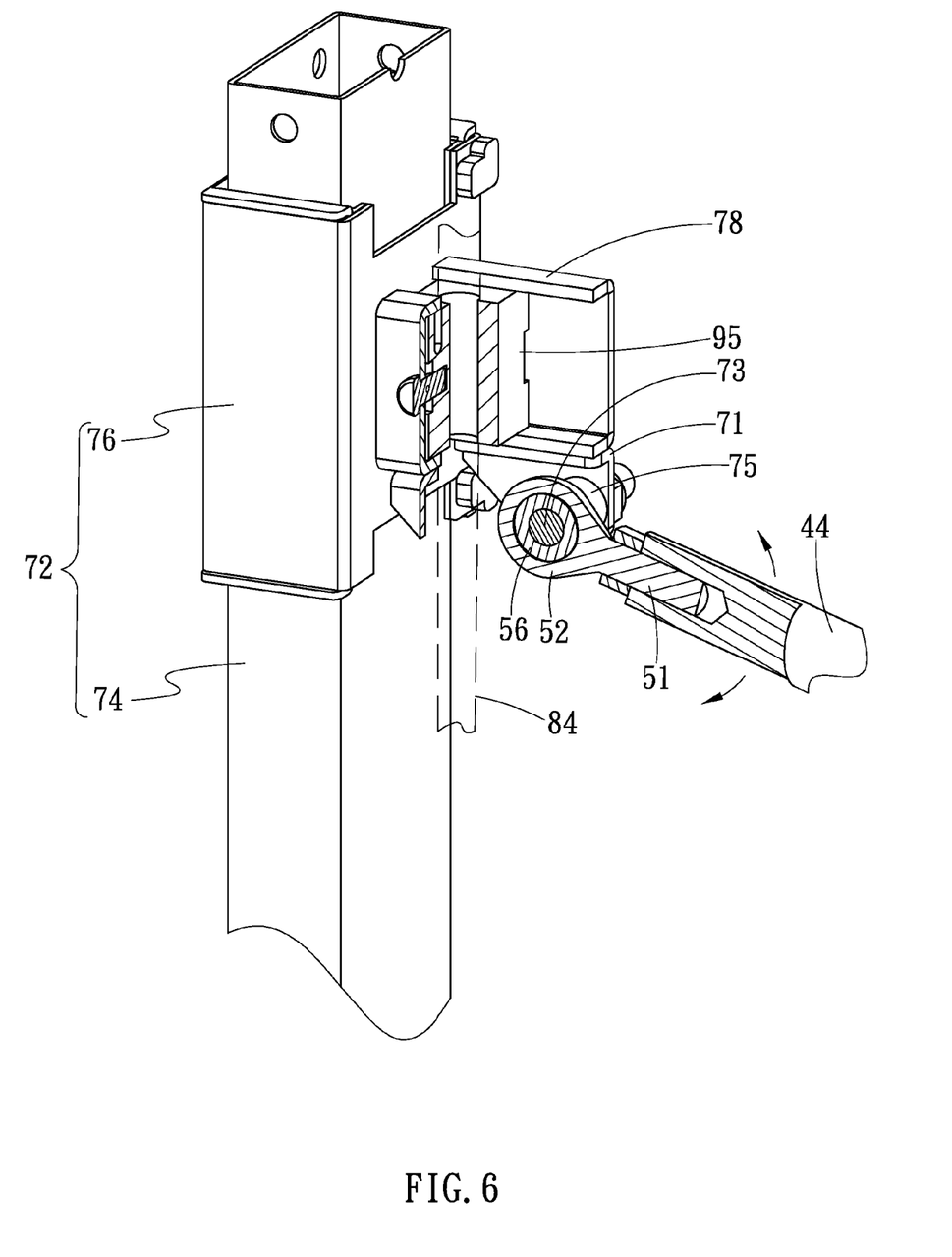
FIG. 6 is a partial and cut-away view of the treadmill illustrated in FIG. 5.

Referring to FIG. 6, the rod 44 is connected to the lugs 71 of the corresponding carriage unit 72 by the corresponding joint 50. Each of the joints 50 consists of an insert 51, an external ring 52 and an internal ring 56. The insert 51 includes an end fit in a bore (not numbered) made in the rod 44 so that the insert 51 is not movable or rotatable relative to the rod 44. The external ring 52 is formed at another end of the rod 44. The internal ring 56 is inserted in the external ring 52.

The internal ring 52 is located between two sleeves 75 that are located between the lugs 71. A screw 73 is inserted in the lugs 71, the sleeves 75 and the internal ring 56 before the screw 73 is engaged with a nut (not numbered). Thus, each of the telescopic elements 40 can be pivoted relative to a corresponding one of the carriage units 72 in two directions indicated by two arrow heads. The screw 73 can be replaced with a pin, a rivet or any other proper fastener.

Figure 7:
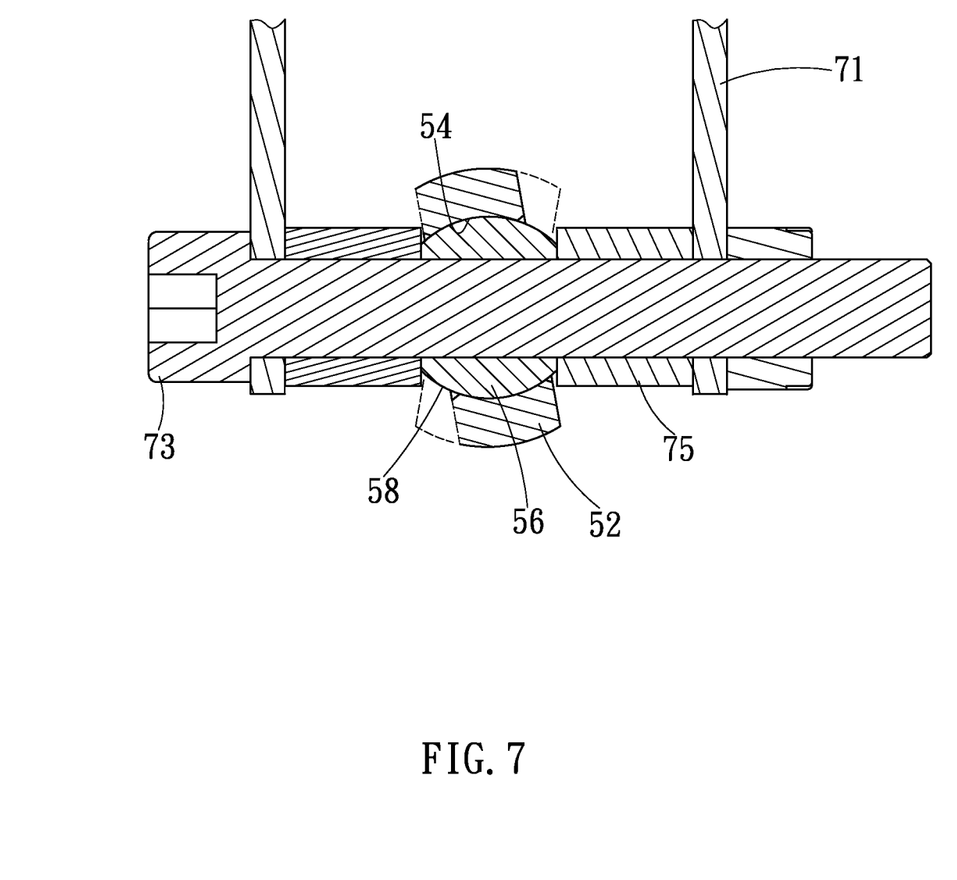
FIG. 7 is a cross-sectional view of the treadmill shown in FIG. 6.

Referring to FIG. 7, the external ring 52 is formed with a concave internal face 54 that can be deemed a portion of a spherical face. The internal ring 56 includes a convex external face 58 in compliance with the concave internal face 54 of the external ring 52. The convex external face 58 of the internal ring 56 is in smooth contact with the concave internal face 54 of the external ring 52. Thus, the rod 44 of each telescopic element 40 can be rotated relative to the corresponding carriage unit 72 in two directions indicated by two arrow heads.

Figure 8:
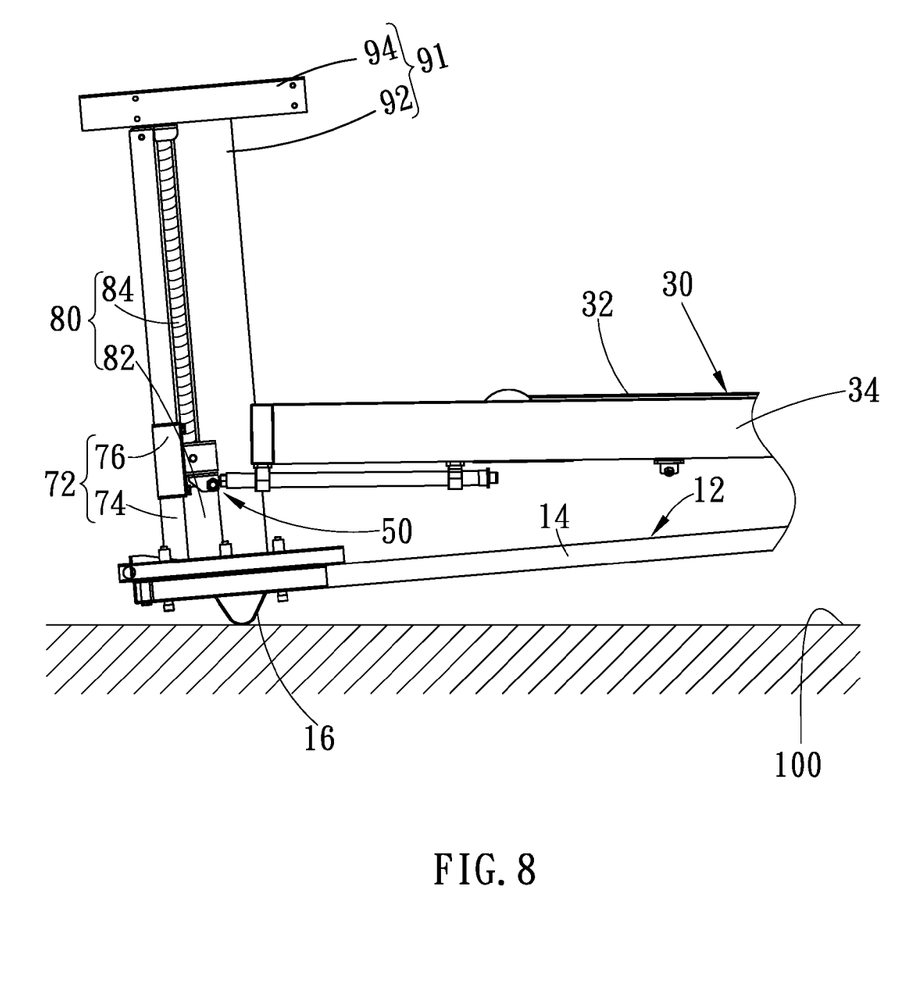
FIG. 8 is a side view of the front portion of the treadmill shown in FIG. 2.

Referring to FIG. 8, the base 12 is placed on a floor 100 for example. The carriages 76 are placed at a same low water level. The platform 34 extends horizontally. The treadmill 10 simulates a horizontal rod.

Figure 9:
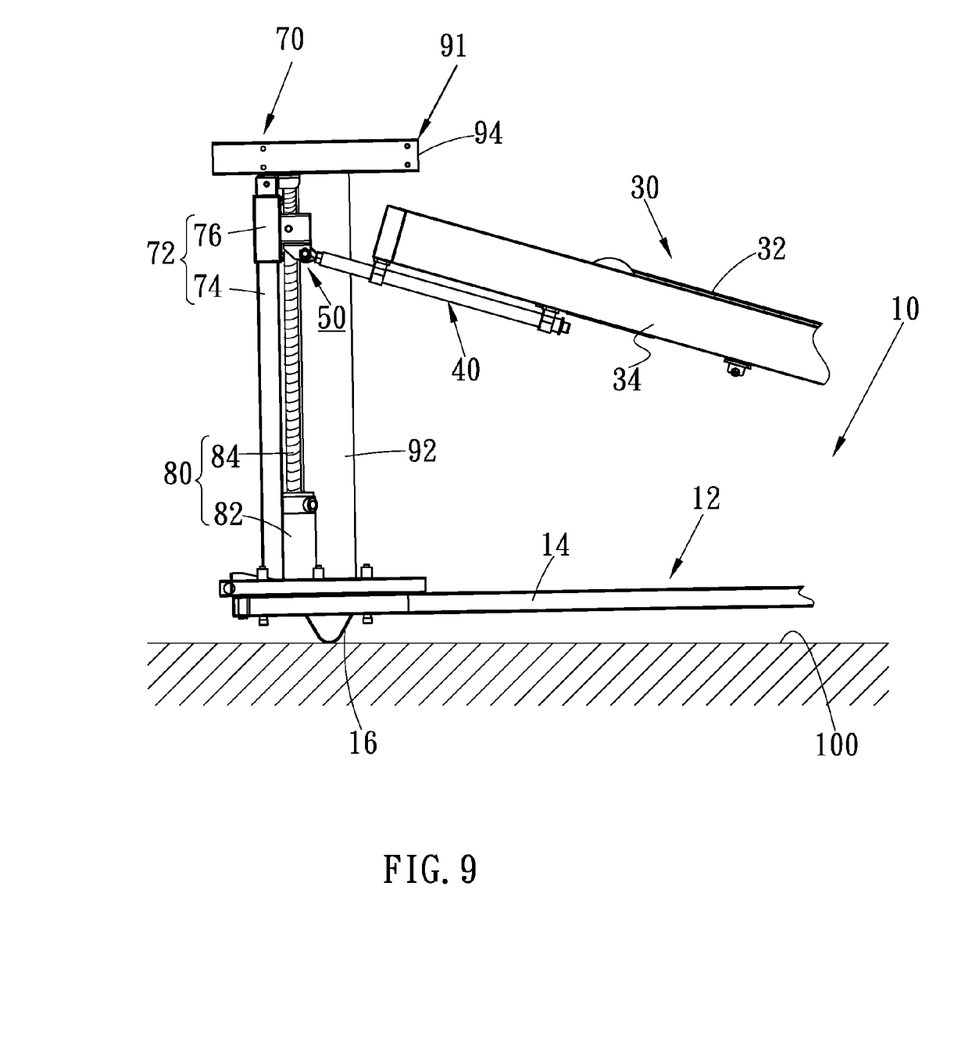
FIG. 9 is a side view of the front portion of the treadmill in another position than shown in FIG. 8.

Referring to FIG. 9, the carriages 76 are placed at a same high water level. Thus, the platform 34 extends in a slant manner. The treadmill 10 simulates a rising slope.

Figure 4:
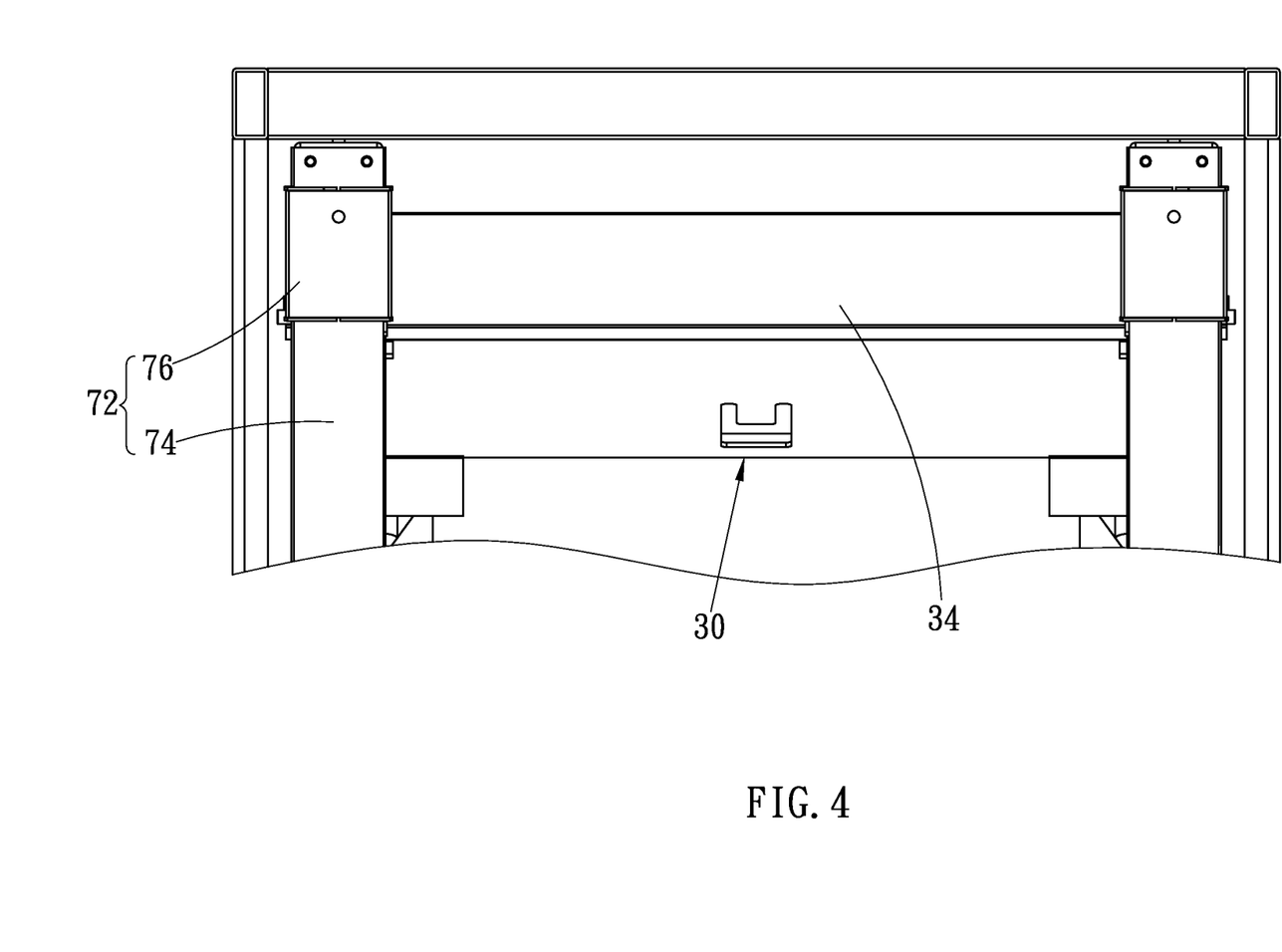
FIG. 4 is a partial and front view of the treadmill shown in FIG. 2.

Referring to FIG. 4, the carriages 76 are placed at the high water level. Hence, the platform 34 is not tilted to the right or left. The treadmill 10 simulates a rising slope.

Figure 10:
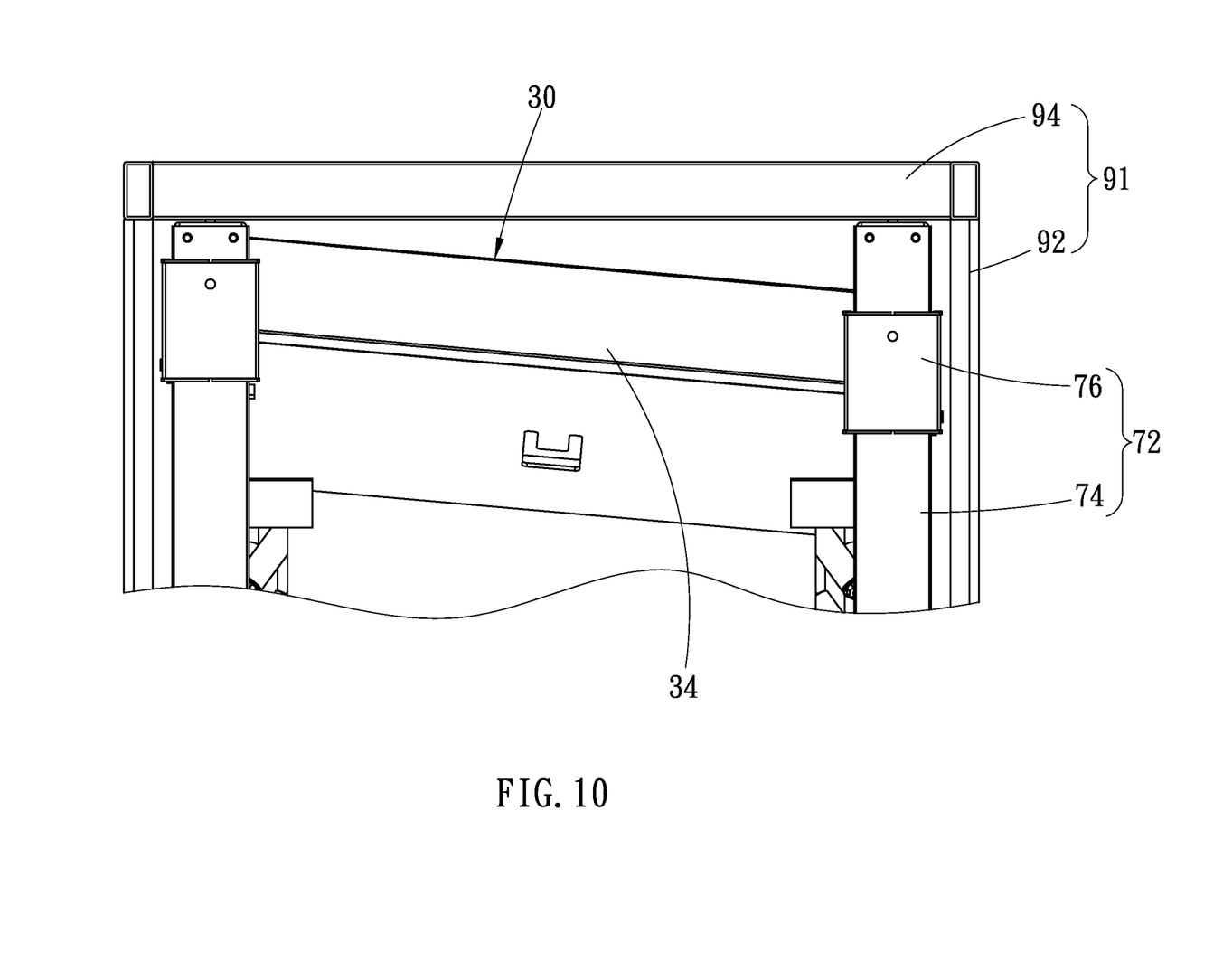
FIG. 10 a partial and front view of the treadmill in another position than shown in FIG. 4.

Referring to FIG. 10, the carriages 76 are placed at different higher water levels. Thus, the platform 34 is tilted laterally. The treadmill 10 simulates a rising and laterally tilted slope.

Advantageously, the platform 34 can be tilted relative to the base 12 about the first axis. That is, the platform 34 can be tilted forward or backward. The platform 34 can further be tilted relative to the base 12 about the second axis. That is, the platform 34 can be tilted to the left or right. The tilting about the first axis and the tilting about the second axis can be conducted synchronously. The telescopic elements 40 are used to avoid distortion of the platform 34 while the platform 34 is tilted.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A treadmill including:
   a base;
   a platform with a looped belt wound around a plurality of rollers;
   a universal joint for connecting a rear portion of the base to a rear portion of the platform to enable the platform to tilt relative to the base about a longitudinal axis and a transverse axis;
   two elevators each including a post supported on a front portion of the base and a carriage movably supported on the post wherein the carriages are independently movable to cause the platform to tilt relative to the base about a longitudinal axis and a transverse axis; and
   two telescopic elements each including an end connected to a front portion of the platform and another end connected to the carriage of a corresponding one of the elevators.

2. The treadmill according to claim 1, wherein each of the elevators includes a motor for driving the carriage.

3. The treadmill according to claim 2, wherein each of the elevators includes:
   a nut connected to the carriage; and
   a threaded rod engaged with the nut and connected to the motor.

4. The treadmill according to claim 3, wherein the carriage is formed with a receptacle for receiving the nut.

5. The treadmill according to claim 1, including two auxiliary joints each for connecting the carriage of a corresponding one of the elevators to a corresponding one of the telescopic elements.

6. The treadmill according to claim 5, wherein the carriage of each of the elevators is formed with two lugs for sandwiching the corresponding auxiliary joint.

7. The treadmill according to claim 6, wherein each of the auxiliary joints includes:
   an external ring connected to the corresponding telescopic element;
   an internal ring rotationally placed in the external ring; and
   a screw for connecting the internal ring to the lugs.

8. The treadmill according to claim 7, wherein the external ring includes a concave internal face and the internal ring includes a convex external face in smooth contact with the concave internal face of the external ring.

9. The treadmill according to claim 8, wherein the concave internal face of the external ring and the convex external face of the internal ring are in the form of part of a spherical face.

10. The treadmill according to claim 7, wherein each of the auxiliary joints includes an insert formed on the external ring and connected to the corresponding telescopic element.

* * * * *